US007350540B2

(12) United States Patent
Carpenter et al.

(10) Patent No.: US 7,350,540 B2
(45) Date of Patent: *Apr. 1, 2008

(54) METHODS AND APPARATUS FOR A DIRECT CONNECT ON-OFF CONTROLLER

(75) Inventors: Dale Carpenter, 930 N. Portland, Gilbert, AZ (US) 85234; Jason Henley, Mesa, AZ (US)

(73) Assignee: Dale Carpenter, Gilbert, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 11/715,105

(22) Filed: Mar. 7, 2007

(65) Prior Publication Data

US 2007/0157974 A1 Jul. 12, 2007

Related U.S. Application Data

(63) Continuation of application No. 11/037,584, filed on Jan. 18, 2005, now Pat. No. 7,210,499.

(51) Int. Cl.
*F16K 11/065* (2006.01)

(52) U.S. Cl. .................................... 137/625.25; 124/74

(58) Field of Classification Search ................ 137/596, 137/625.2, 625.25, 625.26, 625.27, 625.67; 124/73–74; 251/149.6
See application file for complete search history.

(56) References Cited

U.S. PATENT DOCUMENTS

| | | | |
|---|---|---|---|
| 2,904,071 | A | 9/1959 | Stein |
| 3,025,845 | A | 3/1962 | Cardia et al. |
| 4,383,552 | A | 5/1983 | Baker |
| 4,817,667 | A | 4/1989 | Hagar |
| 5,613,483 | A | 3/1997 | Lukas |
| 5,755,213 | A | 5/1998 | Gardner et al. |
| 5,950,611 | A | 9/1999 | Lopez |
| 5,957,119 | A | 9/1999 | Perry et al. |
| 6,240,943 | B1 | 6/2001 | Smith |
| 6,405,722 | B2 | 6/2002 | Colby |
| 6,474,325 | B2 | 11/2002 | Rice et al. |
| 6,539,969 | B1 | 4/2003 | Sullivan |
| 6,543,475 | B2 | 4/2003 | Colby |
| 6,675,791 | B1 | 1/2004 | Alexander et al. |
| 6,941,938 | B2 | 9/2005 | D'arcy et al. |
| 6,959,703 | B1 | 11/2005 | Spurlock et al. |
| 6,983,761 | B2 | 1/2006 | Henley |
| 2001/0050076 | A1 | 12/2001 | Colby |
| 2002/0046748 | A1 | 4/2002 | Hernandez |
| 2002/0096164 | A1 | 7/2002 | Perrone |
| 2002/0104524 | A1 | 8/2002 | Reible |
| 2003/0034021 | A1 | 2/2003 | Gabrel |
| 2003/0178018 | A1 | 9/2003 | Cherry |
| 2003/0226555 | A1 | 12/2003 | Reible |
| 2004/0003848 | A1 | 1/2004 | Callies |
| 2004/0107951 | A1 | 6/2004 | D'Arcy |
| 2005/0115549 | A1 | 6/2005 | Jones |
| 2005/0115552 | A1 | 6/2005 | Dobbins |
| 2006/0000510 | A1 | 1/2006 | Henley et al. |
| 2006/0005824 | A1 | 1/2006 | Carpenter |
| 2006/0011183 | A1 | 1/2006 | Dziob |

*Primary Examiner*—John Rivell
*Assistant Examiner*—Craig M. Schneider
(74) *Attorney, Agent, or Firm*—Letham Law Firm LLC; Lawrence Letham

(57) ABSTRACT

Methods and apparatus according to various aspects of the present invention comprise an on-off controller configured to control the flow of pressurized pneumatic fluid and to connect directly to a pneumatic device. In one embodiment, the on-off controller comprises a body having an inlet, at least one outlet, a vent, at least one connection bore, an activator positioned in the body, a position mechanism configured to move the activator in the body, a seal configured to sealably contact the activator and seal the vent, wherein the body may connect directly to a paintball marker.

20 Claims, 8 Drawing Sheets

METHODS AND APPARATUS FOR A DIRECT CONNECT ON-OFF CONTROLLER

CROSS-REFERENCE TO RELATED APPLICATIONS

This application is a continuation of and claims priority to U.S. application Ser. No. 11/037,584 now U.S. Pat. No. 7,210,499 to Carpenter filed Jan. 18, 2005 and issued May 1, 2007.

BACKGROUND OF THE INVENTION

1. Field of the Invention

This invention pertains generally to methods and apparatus relating to pneumatic valves.

2. Description of Related Art

Pneumatic valves find uses in a variety of situations, such as, natural gas distribution systems, pneumatic tools, and controlling the flow of pressurized air to a paintball marker. Valves may benefit from a system that has a vent that may discharge the pneumatic fluid from the system when the fluid source is shut off, and a body that connects directly to a paintball marker.

BRIEF SUMMARY OF THE INVENTION

Methods and apparatus according to various aspects of the present invention comprise an on-off controller configured to control the flow of pressurized pneumatic fluid and to connect directly to a pneumatic device. In one embodiment, the on-off controller comprises a body having an inlet, at least one outlet, a vent, at least one connection bore, an activator positioned in the body, a position mechanism configured to move the activator in the body, a seal configured to sealably contact the activator and seal the vent, wherein the body may connect directly to a paintball marker.

BRIEF DESCRIPTION OF THE DRAWINGS

A more complete understanding of the present invention may be derived by referring to the detailed description and claims when considered in connection with the figures, wherein like reference numbers refer to similar elements throughout the figures, and:

DETAILED DESCRIPTION OF EXEMPLARY EMBODIMENTS

Figure 1:
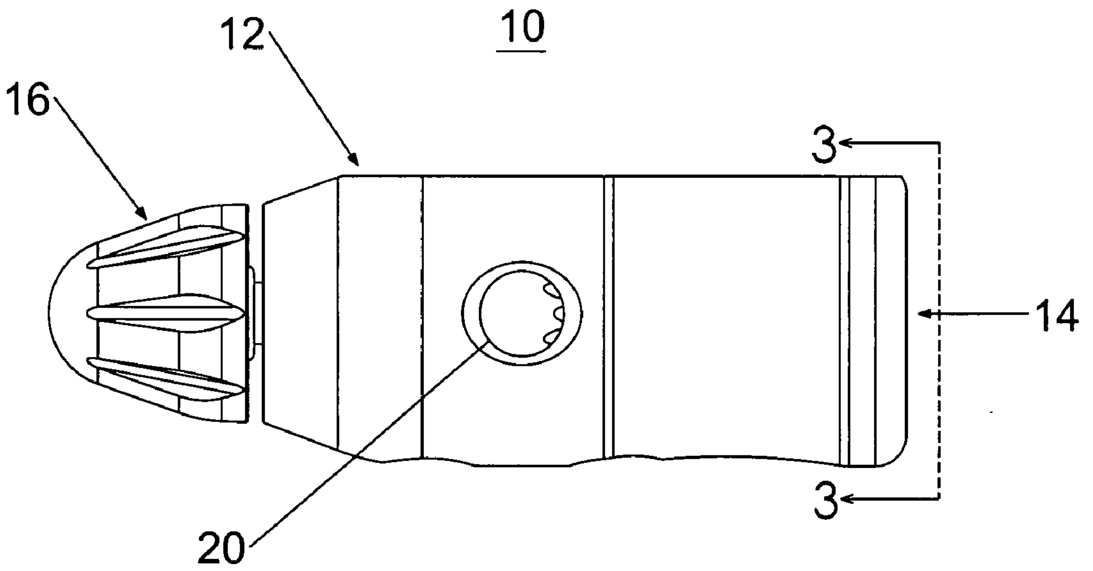
FIG. 1 is a diagram of a side view of an exemplary on-off controller.

The accompanying drawings show an exemplary embodiment by way of illustration and best mode. While these exemplary embodiments are described, other embodiments may be realized and changes may be made without departing from the spirit and scope of the invention. Thus, the detailed description is presented for purposes of illustration only and not of limitation. For example, the steps recited in any of the method or process descriptions may be executed in any suitable order and are not limited to the order presented.

For the sake of brevity, conventional mechanical aspects and components of the individual operating components may not be described in detail. Furthermore, the representations of the various components are intended to represent exemplary functional relationships, positional relationships, and/or physical couplings between the various elements. Many alternative or additional functional relationships, physical relationships, or physical connections may be present in a practical system. The present invention may be embodied as a customization of an existing system, or an add-on product.

The present invention is described partly in terms of functional components and various methods. Such functional components may be realized by any number of components configured to perform the specified functions and achieve the various results. For example, the present invention may be formed using a variety of materials, such as, aluminum, electroplated aluminum, steel, stainless steel, brass, titanium, iron, bronze alloy, plastic, composite materials, nanomaterials, and any other material that may be suitable for an application or environment. The present invention may be used to control the flow of any pneumatic fluid, for example, air, oxygen, natural gas, hydrogen, and so forth. The inlet may be configured to interface with any source of pressurized fluid, such as, a bottle of pressurized fluid, a fluid distribution hose, a pipe, and directly to a pneumatic compressor outlet. The outlet may be configured to interface with a device that may consume pressurized pneumatic fluid, such as pneumatic tools, a gas fireplace, and paintball markers. The outlet may connect directly to a pneumatic device and/or it may connect to a hose that goes to a pneumatic device. The activator may be fashioned of any suitable material, for example, aluminum, electroplated aluminum, steel, brass, titanium, iron, composite materials, nanomaterials, and the like. The activator may be of any size and shape suitable for an application or environment. The position mechanism may be formed of any suitable material and may connect to and/or move the activator in any manner appropriate for the application. For example, the position mechanism may be a lever, a crank, a threaded knob, a screw, a magnetic device, and the like, which may carry out a variety of functions. The seals may be fashion of any suitable material, for example, plastic, Teflon, butyl, polymer, urethane, fluorocarbon polymer material, plastic, polycarbonate, polyethylene, polypropylene, polyvinylchloride, and the like. The seals may have any shape suitable for an application and may be mounted in any suitable manner. The seals may interact with the activator in any manner suitable for the operation of the on-off controller. The on-off controller may assume any operational state, for example, off, off-locked, on, on-locked, vent, vent-locked, and the like to achieve any suitable result.

In addition, the present invention may be practiced in conjunction with any number of applications and environments, and the systems described are merely exemplary applications of the invention. Further, the present invention may employ any number of conventional techniques for manufacture, testing, connecting, mounting, and repair.

Methods and apparatus according to various aspects of the present invention comprise an on-off controller configured to control the flow of pressurized pneumatic fluid and to mount directly to a pneumatic device such as, for example, a paintball marker. For example, a source of pressurized fluid may be a bottle having a poppet valve configured to release pressurized fluid from the bottle outlet when the poppet is depressed. An on-off controller inlet may connect to the bottle outlet. An activator, positioned in the on-off controller body, may be configured to depress the bottle poppet valve to allow pressurized fluid from the bottle outlet to enter the on-off controller inlet, pass through the on-off controller body, and out an on-off controller outlet. A position mechanism may move and/or control the position of the activator. The on-off controller may be placed in an on-state by moving the activator such that it depresses the bottle poppet; thereby starting the flow of pressurized fluid. The on-off controller may be placed in an off-state by moving the activator away from the bottle poppet such that the poppet is no longer depressed; thereby stopping the flow of pressurized fluid. Moving the activator past the off-state position may place the on-off controller in a vent-state where pressurized fluid in the body and/or in any cavity connected to an on-off controller outlet exits to the atmosphere. In the vent-state, the on-off controller may be removed more easily from the bottle. The on-off controller method and apparatus may be used for any suitable purpose or combination of purposes, such as controlling the flow of pressurized fluid to a paintball marker, a spray painter, injection molding equipment, an air horn, a gas stove, or any other suitable application.

Figure 2:
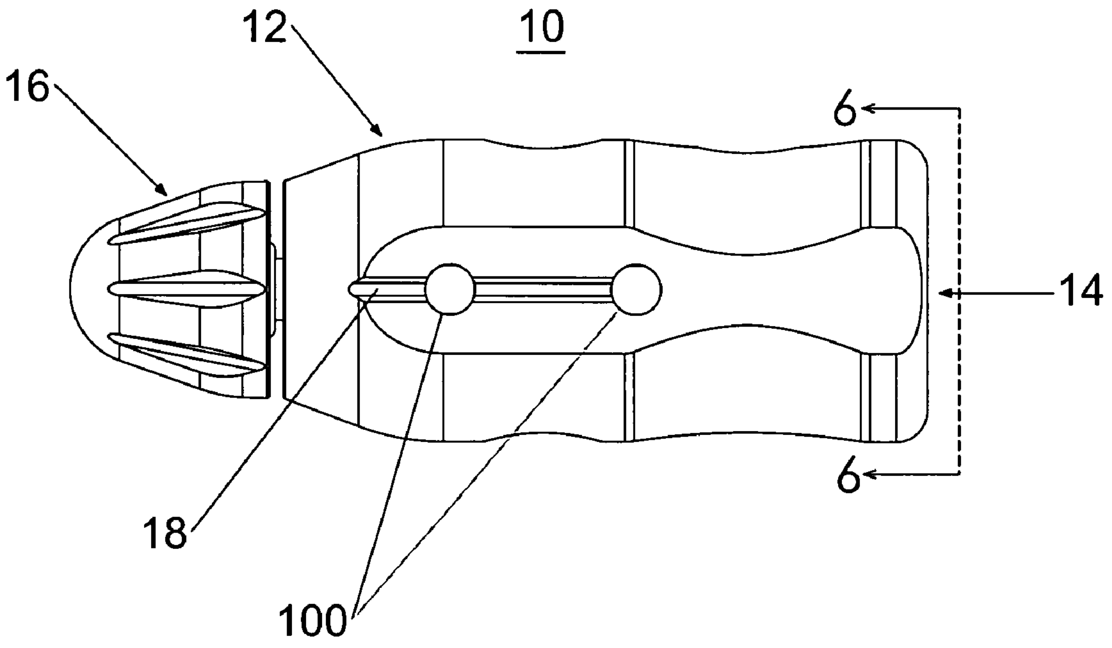
FIG. 2 is a diagram of a top view of an exemplary on-off controller.
Figure 3:
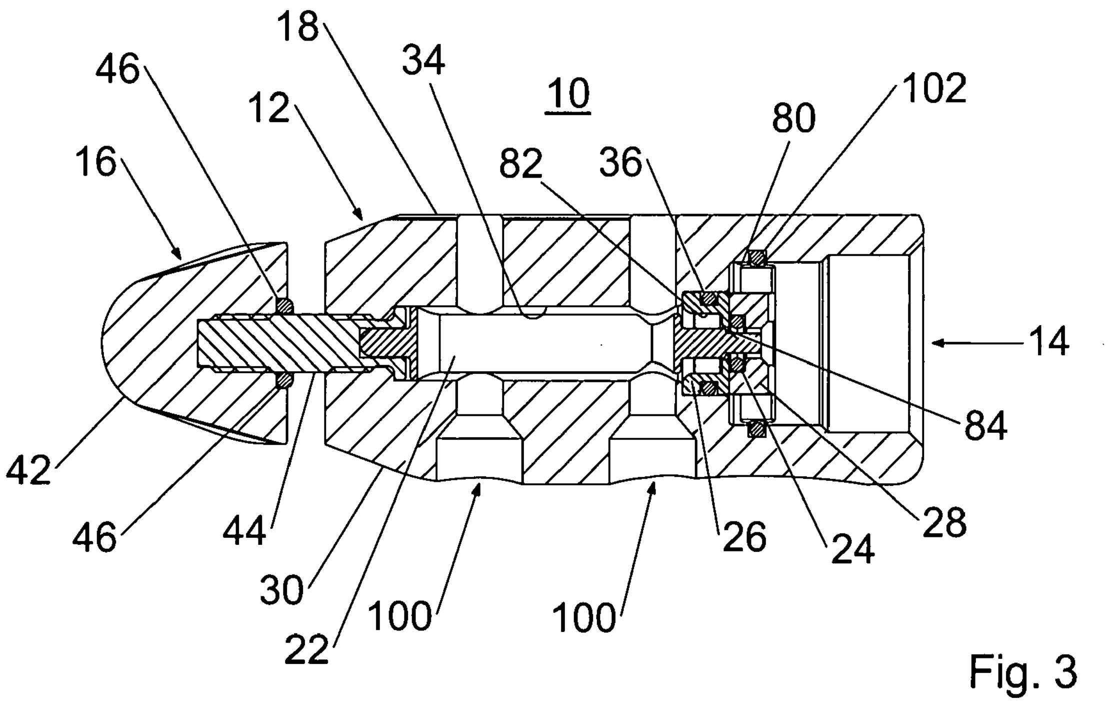
FIG. 3 is a cross-section diagram of the exemplary embodiment of FIG. 1 taken along the line 3-3 with the activator in the vent-state.
Figure 4:
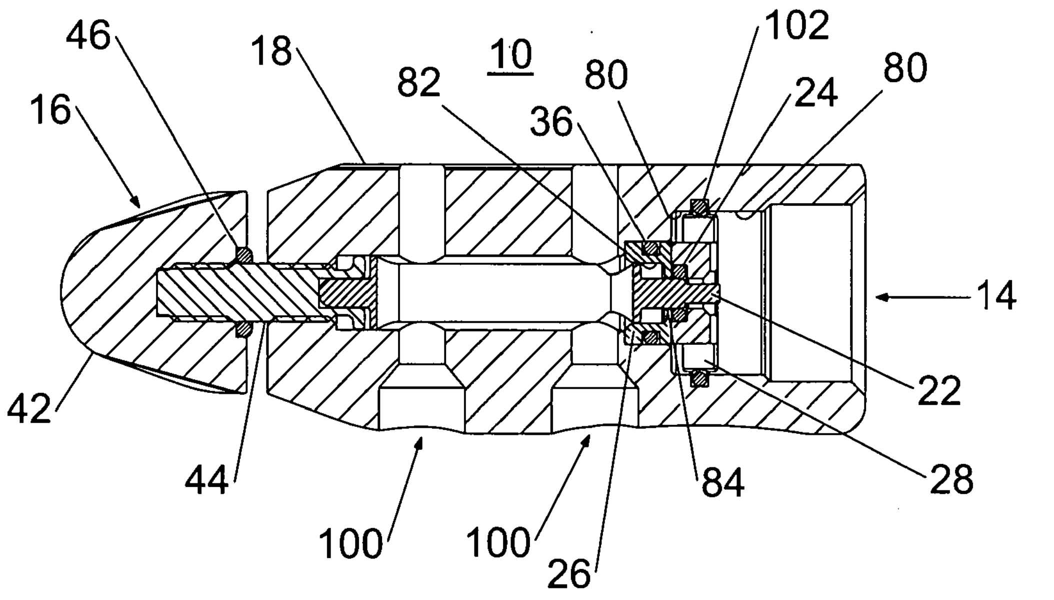
FIG. 4 is a cross-section diagram of the exemplary embodiment of FIG. 1 taken along the line 3-3 with the activator in the off-state.
Figure 5:
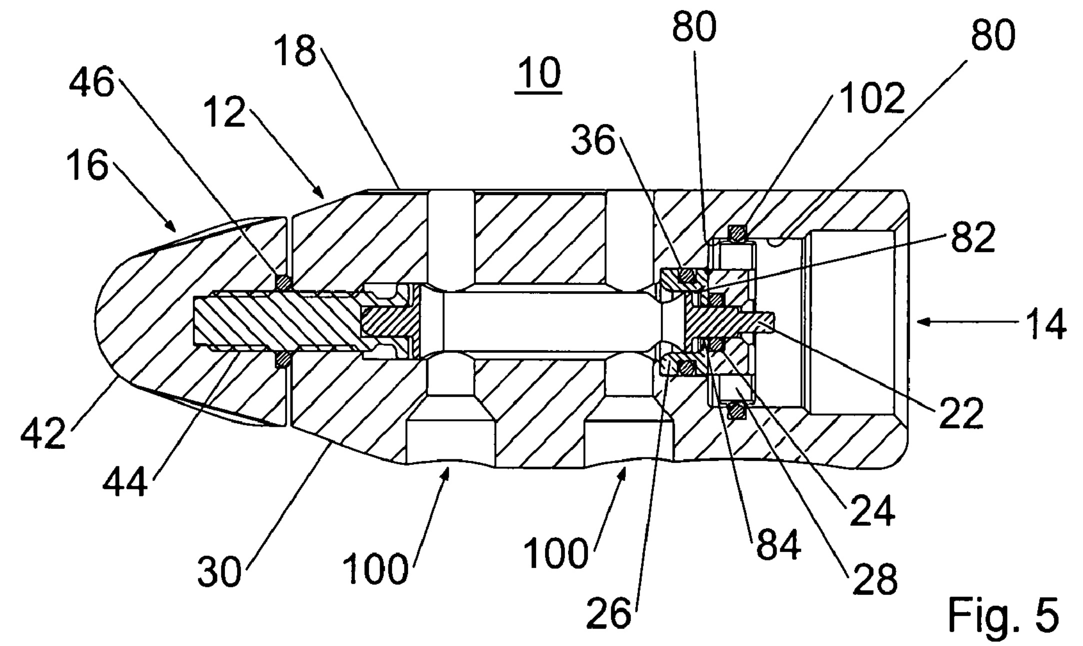
FIG. 5 is a cross-section diagram of the exemplary embodiment of FIG. 1 taken along the line 3-3 with the activator in the on-state.

In particular, referring to FIGS. 1-3, a on-off controller 10 according to various aspects of the present invention comprises a body 12 having an inlet 14, at least one outlet 20, a vent channel 18, an activator 22 positioned axially in the body 12, a position mechanism 16 configured to move the activator 22 axially, and a seal 24, wherein the position of the activator 22 may define operating states such as an on-state, an off-state, and a vent-state. The on-state, referring to FIG. 5, may occur when the position mechanism 16 moves the activator 22 into contact with the poppet of a pressurized bottle (not shown). Depressing the bottle poppet may allow the release of pressurized fluid into the inlet 14 where a body cavity 80 may fill and pressurized fluid may then exit through outlets 20. The off-state, referring to FIG. 4, may occur when the position mechanism 16 moves the activator 22 away from the bottle poppet (not shown); thereby stopping the flow of pressurized fluid into the body cavity 80. In the off-state, when the device connected to the outlets 20 do not consume any fluid, pressurized fluid remains in the body cavity 80 because the seal 24 blocks a vent passage 84 to a vent cavity 82, a connection bores 100, and a vent channel 18. The vent-state, referring to FIG. 3, may occur when the position mechanism 16 moves the activator 22 into a position where the vent passage 84 is open. When the vent passage 84 is open, pressurized fluid from the body cavity 80 and any cavities connected to outlets 20 exits through vent passage 84 into vent cavity 82, through connection bores 100, and out vent channel 18 to the atmosphere.

Figure 7:
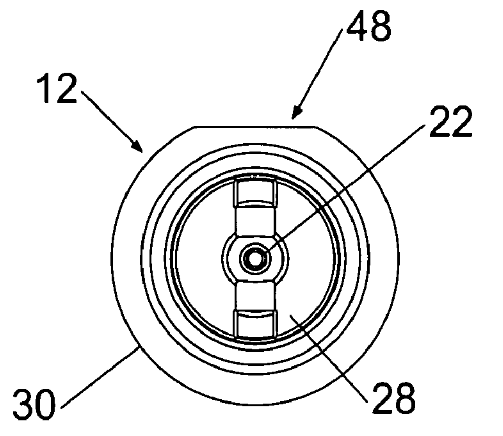
FIG. 7 is a diagram of an end view into the inlet of an exemplary embodiment of an on-off controller.
Figure 8:
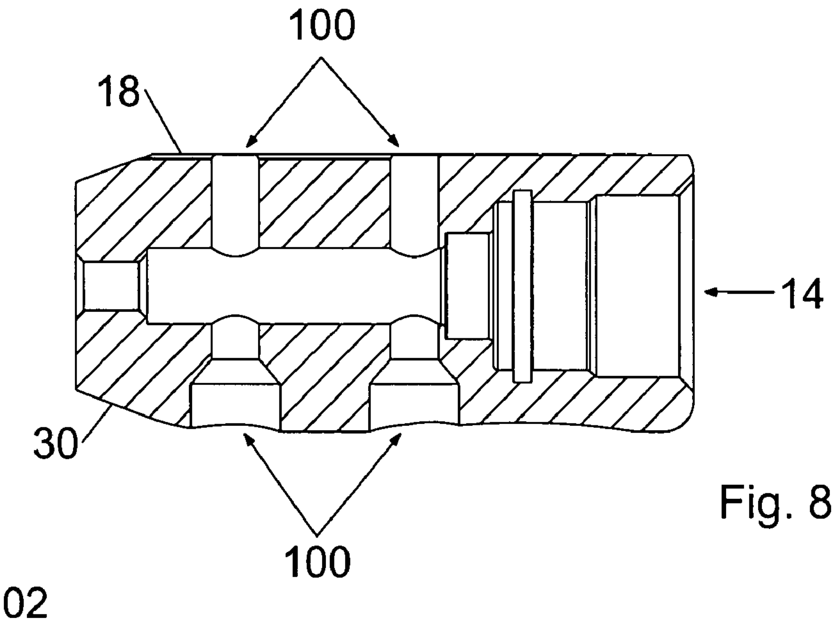
FIG. 8 is a cross-section diagram of an exemplary outer shell of the exemplary embodiment of FIG. 1 taken along the line 3-3.

The body 12 may be of any material, shape, size, and configuration for an application or environment. The body 12 may use any material or combination of materials suitable for an application, for example, at least one of aluminum, electroplated aluminum, steel, stainless steel, brass, titanium, iron, copper, zinc, composite materials, and nanomaterials. The body 12 may have at least one connection bore 100 configured to connect the body 12 directly to a device, such as, for example, an air horn, a paintball marker, and other pneumatic device. In an exemplary embodiment, referring to FIG. 3, the body 12 has two connections bores 100 configured to connect the body 12 directly to a paintball marker. The body may be of any shape, for example, cylindrical, rectangular, spherical, oblong, and irregularly shaped. In an exemplary embodiment, referring to FIGS. 3, 7, and 8, the body 12 is substantially cylindrical. In an exemplary embodiment, the body 12 may have a center axis. Other parts of the on-off controller may be axial to the center axis. In an exemplary embodiment, the inlet 14 is axial to the center axis.

Figure 9:
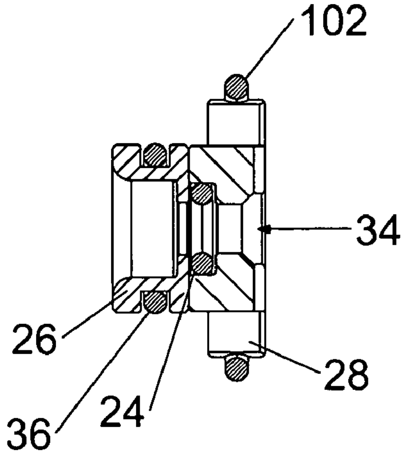
FIG. 9 is a cross-section diagram of an exemplary activator mount and seal ring of the exemplary embodiment of FIG. 1 taken along the line 3-3.
Figure 10:
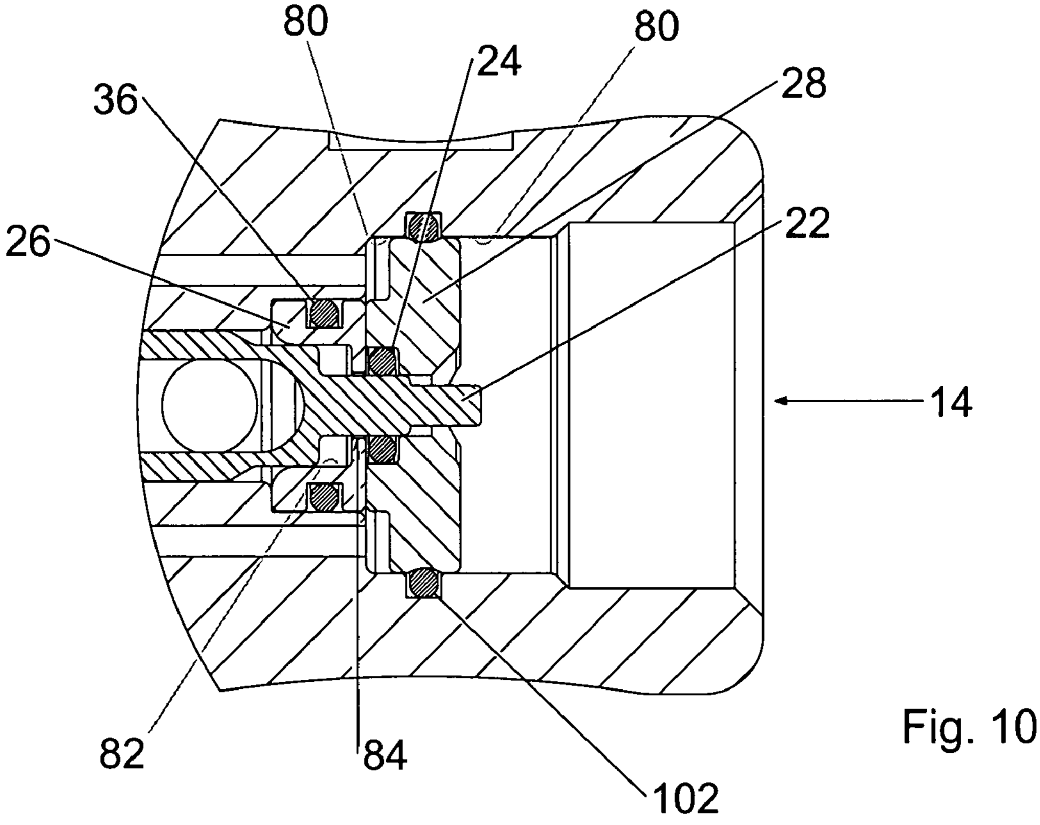
FIG. 10 is a close-up, cross-section diagram of the exemplary embodiment of FIG. 1 taken along the line 3-3 with the activator in the on-state.

The body 12 may be formed of a single piece of material or of multiple assembled pieces. In one embodiment, referring to FIGS. 3, 8-10, a body 12 formed of multiple pieces may comprise an outer shell 30 having axial bores of different diameters and connection bores 100, a gas wall insert 28, a seal ring 26 configured to position an activator 22 axially in the outer shell 30 and to hold seal 24 in position in gas wall insert 28 such that seal 24 may form sealable contact with activator 22. An activator bore 34, referring to FIG. 9, may be configured to moveable position activator 22 axially in body 12. Seal ring 26 may be configured to allow the escape of pressurized fluid from a body cavity 80 through activator bore 34 past seal 24, through a vent passage 84, into a vent cavity 82, into connection bores 100, and out vent channel 18 to the atmosphere when the activator 22 is in the vent-state position. A seal ring seal 36, in conjunction with seal 24, may define the fluid boundary between the body cavity 80 and the vent cavity 82. Seal ring seal 36, outer shell 30, seal ring 26, seal 24, and gas wall insert 28 cooperatively seal body cavity 80 such that pressurized fluid does not escape from body cavity 80 into vent cavity 82 except in the vent-state where seal 24 does not seal the vent passage 84. The gas wall insert detent 102 may assist in securing gas wall insert 28 in outer shell 30. Outer shell 30, gas wall insert 28, and seal ring 26 may be made of the same or different materials.

Inlet 14 may be positioned at any location in body 12, for example, axially, angularly to an axis, one a side, and on an end. In an exemplary embodiment, inlet 14 is positioned on one end of a substantially cylindrical body 12 and is axial to the activator 22, sealing ring 26, gas wall insert 28, and outer shell 30. Inlet 14 may connect to a source of pressurized fluid in any suitable manner. For example, inlet 14 may connect to a source using a quick connect coupler, a screw connection, a press fit connection, a clamp connection, and any other type of connector suitable for the application. In an exemplary embodiment, the inlet 14 threadedly connects to a bottle using a ½-14 NPSM thread.

Body 12 may have at least one outlet 20. Each outlet 20 may be positioned at any location on body 12. In one embodiment, at least one outlet 20 is positioned substantially perpendicular to the axis of body 12. Each outlet 20 may connect in any suitable manner to any type of device that uses pressurized fluid. For example, each outlet 20 may connect to a pneumatic device using at least one of a quick connect coupler, a threaded connection, a press fit connection, a clamp connection, and any other type of connector suitable for an application. In one embodiment, each outlet 20 may connect to a hose fitting in a threaded manner. In an exemplary embodiment, the hose fitting connects to each of the outlets 20 using a ⅛" NPT thread and the hose connects to the fitting using a push-lock connection. Fluid communication between inlet 14 and each of the outlets 20 may be established in any manner. In one embodiment, inlet 14 is in constant fluid communication with each outlet 20 through body cavity 80. Body cavity 80 may be a cavity of any nature, for example, an axial bore and/or at least one passage between the inlet 14 and each outlet 20. In an exemplary embodiment, the body cavity 80 comprises an axial bore and three passages from the axial bore to each outlet. In another embodiment, inlet 14 has fluid communication with at least one outlet 20 only in the on-state. In another embodiment, inlet 14 had fluid communication with at least one outlet 20 only in the on-state and the off-state.

Activator 22 may be any configuration, size, and material suitable for an application or environment. The activator 22 may be configured to activate and/or deactivate the flow of pressurized fluid into the inlet 14 in any suitable manner, for example, the activator 22 may control fluid flow through physical contact, magnetic activation, light activation, electrical activation, heat, vibration, and any other manner suitable for the configuration. In an exemplary embodiment, a bottle of pressurized fluid (not shown) connects to inlet 14. Fluid flow from the bottle is controlled by a poppet valve at the outlet of the bottle. Depressing the poppet enables pressurized fluid to flow from the bottle into the inlet 14. The poppet valve may be resiliently urged into a closed position when the poppet is in a non-depressed position. Decreasing the pressure the activator 22 exerts on the poppet may enable the poppet to move to a closed position; thereby stopping the flow of pressurized fluid from the bottle into the inlet 14. The movement of the poppet into the closed position may also move activator 22 into the off-state position. The position of activator 22 controls the poppet position and therefore the flow of pressurized air. In one embodiment, the activator 22 may be positioned axially to the poppet such that axial movement of activator 22 may depress or release the poppet thereby enabling or disabling, respectively, the flow of pressurized fluid from the bottle into outlet 14. In another embodiment, the activator may be positioned to one side of the poppet and may be shaped in such a manner that movement of the activator 22 across the poppet causes the poppet to be depress and movement away from the poppet enables the poppet to return to its closed position.

Figure 11:
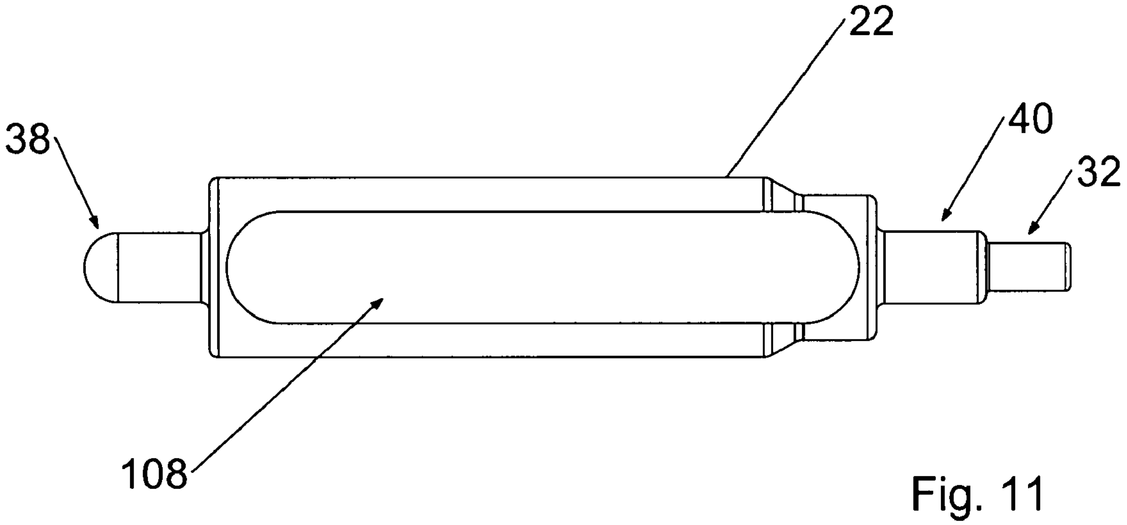
FIG. 11 is a perspective diagram of an exemplary activator.
Figure 12:
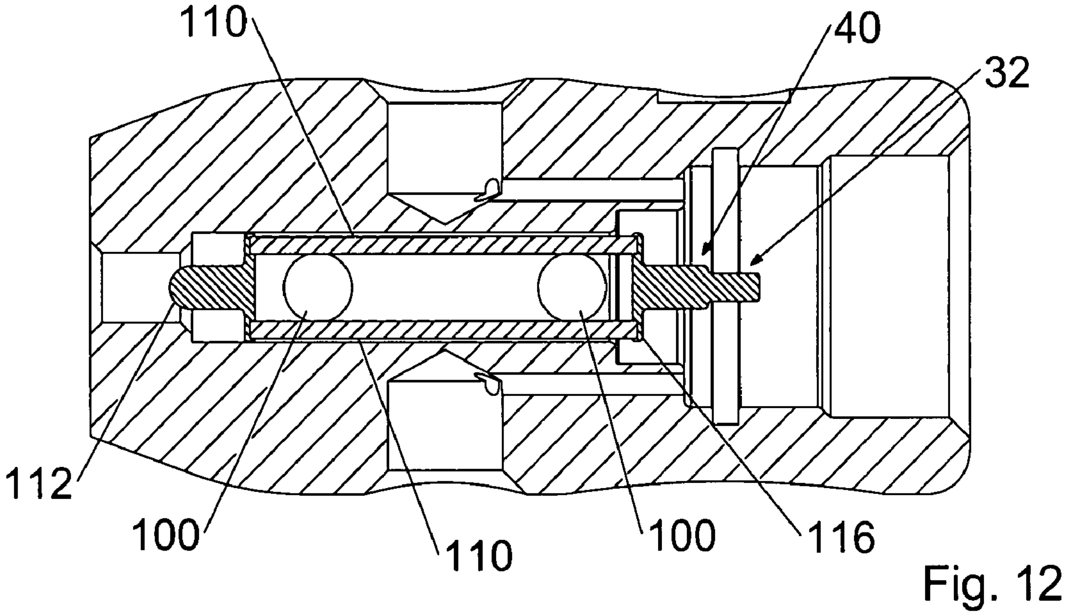
FIG. 12 is a diagram of a top view of an alternate activator embodiment.
Figure 13:
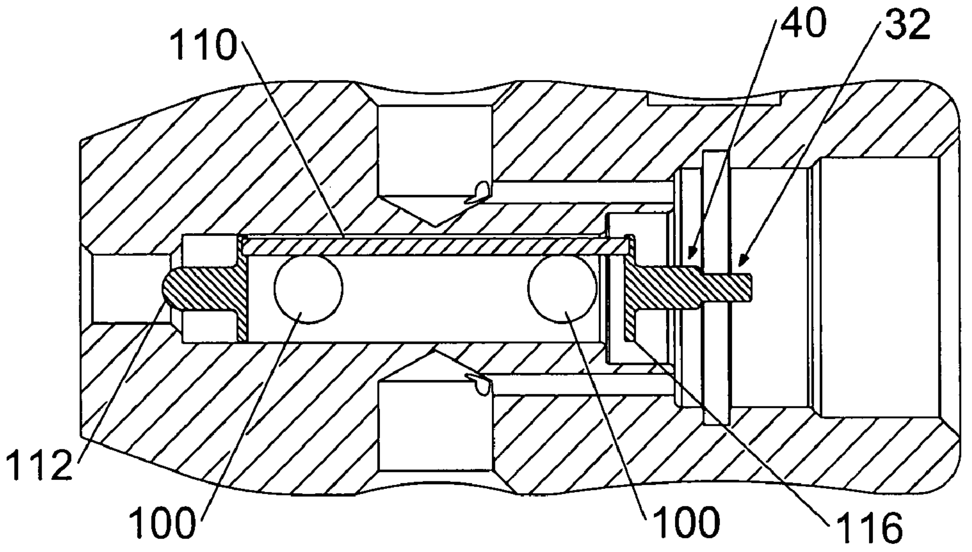
FIG. 13 is a diagram of a top view of an alternate activator embodiment.
Figure 14:
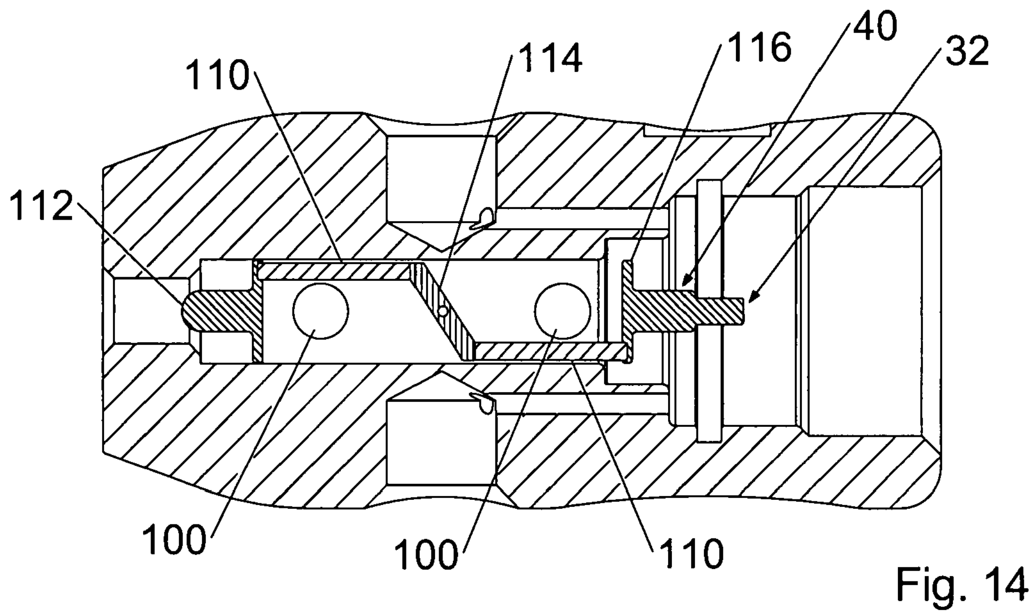
FIG. 14 is a diagram of a top view of an alternate activator embodiment.

Activator 22 may have any shape and/or size suitable for an application or environment and may be formed as a single piece or from multiple pieces. For example, the activator 22 may be a single piece rod, a single piece rod of varying diameter, a single piece rod with a slot, a multiple piece rod, and a combination of multiple parts of suitable shapes. In one embodiment, referring to FIG. 11, the activator 22 is a substantially cylindrical rod of varying diameter with a slot extending from substantially near one end to substantially near the other end. In another embodiment, referring to FIGS. 12 13, the activator 22 comprises a position connector 112, a depressor 116, and at least one pin 110. A portion of position connector 112 and depressor 116 may be substantially positioned and may move substantially axially in body 12. Pins 110 may interface with position connector 112 and depressor 116 in any suitable manner. For example, pins 110 may be connected in a rigid and/or a non-rigid manner. A rigid connection between position connector 112, depressor 116, and the pins may make activator 22 a substantially rigid body where all parts move substantially together. A non-rigid connection may result in an activator where all parts move substantially together only under specific circumstances. In an exemplary embodiment, each pin 110 is disposed in a bore; however, each pin 110 does not rigidly connect to position connector 112 and depressor 116. A force pushing on position connector 112 forces contact between the position connector 112 and the pin 110 which may result in the transfer of a pushing force from position connector 112, to pin 110, and to depressor 116. A non-rigid connection may not allow the transfer of a pulling force from one part to another. In another embodiment, position connector 112 is rigidly connected to each of pins 110, which in turn are rigidly connected to depressor 116. Any movement in any part, position connector 112, pins 110, and depressor 116, may result in movement of all parts. Pins 110 may be any shape, size, or material suitable for an application or environment. Any number of pins 110 may be used. In one embodiment, referring to FIG. 12, the activator 22 may use at least two pins 110 to interface between the position connector 112 and the depressor 116. In another embodiment, referring to FIG. 13, at least one pin 110 is used. Pins 110 may use any suitable mechanism to transfer movement between the position connector 112 and depressor 116. In another embodiment, referring to FIG. 14, pins 110 interface with lever 114 in addition to the position connector 112 and the depressor 116.

The activator 22 may be configured to interface with the position mechanism 16 in any suitable manner for an application and environment. For example, the position mechanism 16 may connect to one end of a rod-shaped activator 22, to a side of a rod-shaped activator 22, to a pin 110, to a position connector 112, and a depressor 116. In an exemplary embodiment, referring to FIG. 11, a first end 38 of a rod-shaped activator 22 may be configured to interface with position mechanism 16. The first end 38 of activator 22 may be substantially rounded and of such a shape to loosely interface with position mechanism 16 to reduce friction and the likelihood of rotating activator 22 when position mechanism 16 rotates. In another embodiment, referring to FIGS. 12-13, position connector 112 may also be may be substantially rounded and of such a shape to loosely interface with position mechanism 16 to reduce friction and the likelihood of rotating position connector 112 when position mechanism 16 rotates.

The activator 22 may be configured to interface with the source of pressurized fluid in any suitable manner for an application and environment. In an exemplary embodiment, referring to FIG. 11, a second end of a rod-shaped activator 22 may have two different diameters 40 and 32. Diameter 32 of the second end of activator 22 may be configured to contact the poppet valve of a source of pressurized fluid. In an exemplary embodiment, diameter 32 may be about 80/1000 of an inch. In another embodiment, the diameter 32 may be about 100/1000 of an inch. Diameter 40 of the second end of activator 22 may be configured to sealably contact seal 24. In an exemplary embodiment, diameter 40 of the second end of activator 22 sealably contacts seal 24 in the on-state and the off-state. In the vent-state, the sealed contact between diameter 40 of the second end of activator 22 and seal 24 is broken thereby venting pressurized fluid from body cavity 80. Pressurized fluid in body cavity 80 applies force against surface area of diameter 40, diameter 32, and the area where the diameter increases from diameter 32 to diameter 40. The force of the pressurized fluid against a larger surface area may be greater than the force against a lesser surface area; therefore, increasing diameter 40 may increase the amount of force required to move activator 22. At the same time, diameter 40 must be large enough to sealably contact seal 24 in the on-state and the off-state. In an exemplary embodiment, diameter 40 is 125/1000 of an inch. In another embodiment, referring to FIGS. 12-14, depressor 116 may have also have two different diameters 40 and 32.

Figure 6:
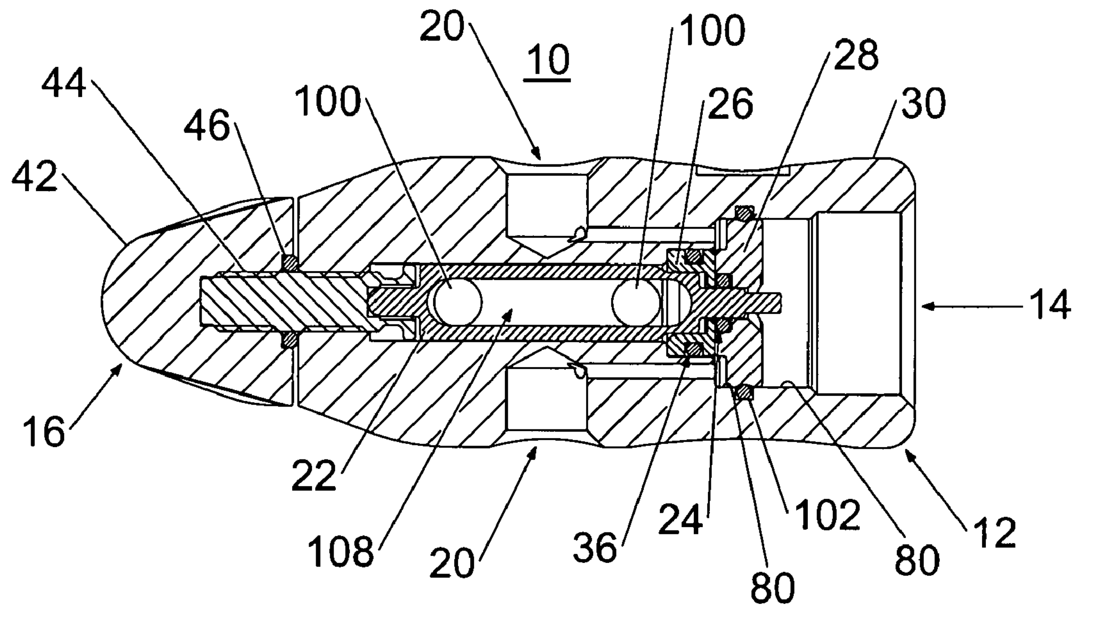
FIG. 6 is a cross-section diagram of the exemplary embodiment of FIG. 2 taken along the line 6-6 with the activator in the on-state.
Figure 15:
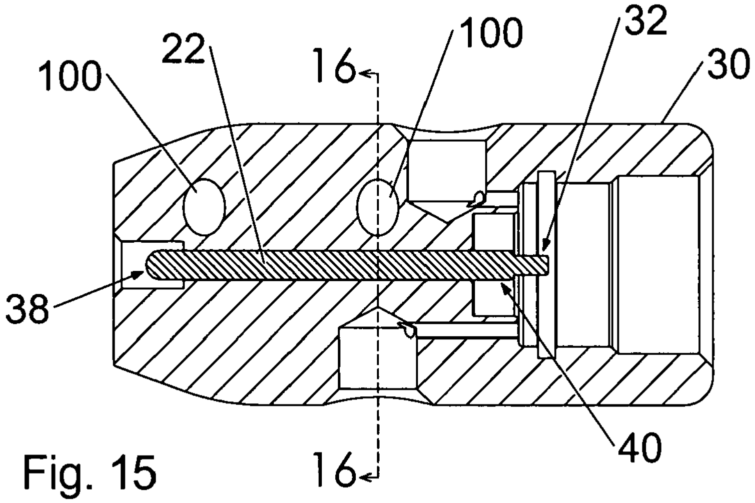
FIG. 15 is a diagram of a top view of an angled connection bore embodiment.
Figure 16:
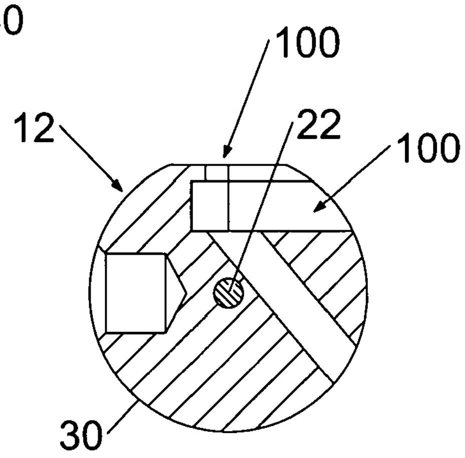
FIG. 16 is a cross-section diagram of the angled connection bore embodiment of FIG. 15 taken along the line 16-16.
Figure 17:
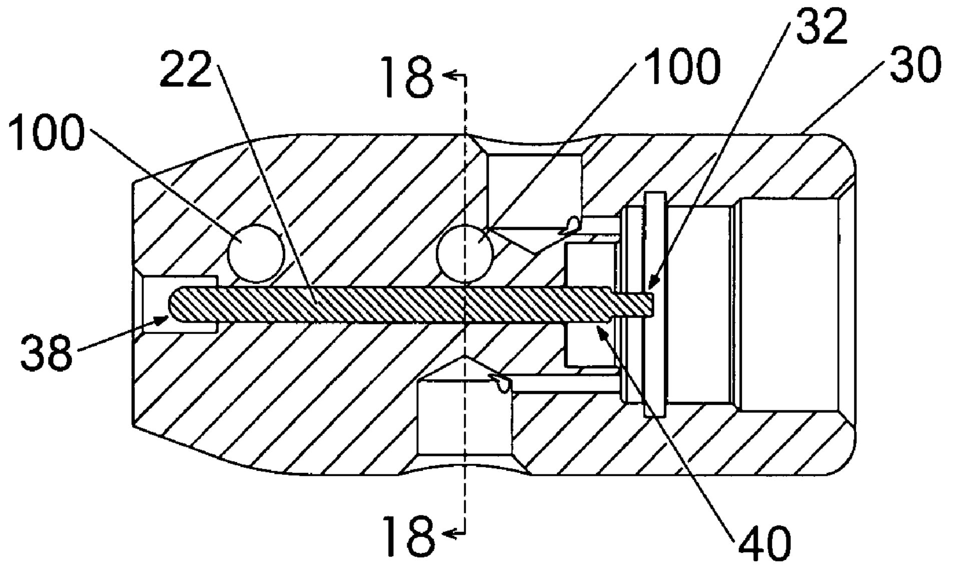
FIG. 17 is a cross-section diagram of a top view of an offset connection bore embodiment.
Figure 18:
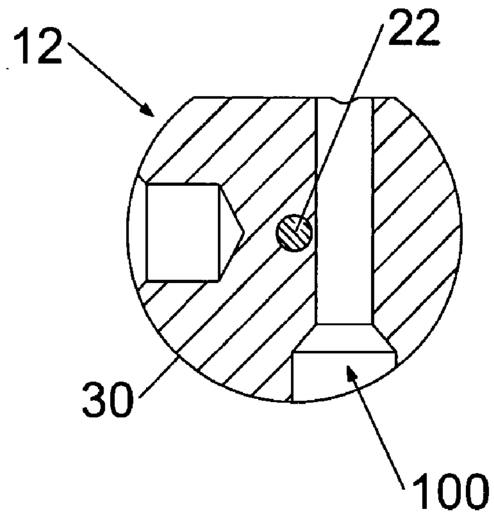
FIG. 18 is a cross-section diagram of the offset connection bore embodiment of FIG. 17 taken along the line 18-18.

The activator 22 may be configured in any manner to not block the connection bores 100. In an exemplary embodiment, referring to FIGS. 6 and 11, rod-shaped activator 22 may have a slot 108 such that activator 22 does not block connection bores 100; thereby keeping connection bores 100 clear for use. Additionally, the object inserted in and/or through connection bores 100 to connect the body 12 to a pneumatic device may be shaped to not restrict the movement of activator 22. In other embodiments, referring to FIGS. 12-14, pins 110 may be positioned in the body away from connection bores 100 such that pins 110 may not intersect and/or interfere with connection bores 100. In another embodiment, referring to FIGS. 15-16, connection bores 100 may be formed angularly in the body 12 and offset from the body 12 center axis in such a manner as to allow direct connection of the body 12 to a pneumatic device while at the same time not interfering with or hindering the movement of activator 22. In another embodiment, connection bores 100 may be offset from the axis of body 12; thereby allowing a rod-shaped activator 22 to be positioned axially without intersecting and/or interfering with connection bores 100.

The activator 22 may be configured in any manner to not block the connection bores 100. In an exemplary embodiment, referring to FIGS. 6 and 11, rod-shaped activator 22 may have a slot 108 such that activator 22 does not block connection bores 100; thereby keeping connection bores 100 clear for use. Additionally, the object inserted in and/or through connection bores 100 to connect the body 12 to a pneumatic device may be shaped to not restrict the movement of activator 22. In other embodiments, referring to FIGS. 12-14, pins 110 may be positioned in the body away from connection bores 100 such that pins 110 may not intersect and/or interfere with connection bores 100. In another embodiment, referring to FIGS. 15-16, connection bores 100 may be formed angularly in the body 12 and offset from the body 12 center axis in such a manner as to allow direct connection of the body 12 to a pneumatic device while at the same time not interfering with or hindering the movement of activator 22. In another embodiment, connection bores 110 may be offset from the axis of body 12; thereby allowing a rod-shaped activator 22 to be positioned axially without intersecting and/or interfering with connection bores 100.

The position mechanism 16 may use any material or combination of materials suitable for the particular application, for example, at least one of aluminum, electroplated aluminum, steel, stainless steel, brass, titanium, iron, copper, zinc, plastic, composite materials, and nanomaterials. The position mechanism 16 may be of any configuration for a particular application or environment suitable for moving activator 22 and may interface with any portion of activator 22. For example, the position mechanism 16 may be a lever, a screw, a threaded knob, a solenoid, a magnetic device, a stepping motor, a servo motor, and any other suitable device. The position mechanism 16 may be formed of a single piece of material or several assembled pieces. In an exemplary embodiment, referring to FIG. 3, the position mechanism 16 comprises a knob 42, a knob connector 44, and a detent 46. The knob connector 44 may be threadedly connected to outer shell 30 and contact activator 22. Knob 42 is connected to knob connector 44. Turning knob 42 moves knob connector 44 into and out of outer shell 30. In an exemplary embodiment, the threads of knob connector 44 may be two-start threads and may enable knob connector 44 to move a greater distance into or out of body 12 with each turn. Knob connector 44 may be configured to twist as it goes into and out of shell 30 without turning activator 22. In one embodiment, as discussed above and as shown in FIGS. 3 and 11, the first end 38 of a rod-shaped activator 22 interfaces with knob connector 44. The first end 38 may be rounded and/or have a loose fit to decrease friction between activator 22 and activator connector 44; thereby decreasing the likelihood that activator 22 will rotate with the activator connector 44. Reducing the amount activator 22 rotates may reduce wear, reduce contact with any mounting devices placed in connecting bores 100 and may increase reliability. In another embodiment, referring to FIGS. 12-14, position connector 112 may be configured to interface loosely with knob connector 44 such that rotations of knob connector 44 may not result in rotational force on position connector 112 and activator 22. Detent 46 may secure knob 42 and knob connector 44 in position when knob 42 is substantially close to outer shell 30. In one embodiment, referring to FIG. 5, detent 46 secures knob 42 and knob connector 44 substantially in position when the activator 22 is in the on-state position.

Seal 24 and seal ring seal 36 may be of any material, size, and configuration for an application or environment. Seal 24 and seal ring seal 36 may use any material suitable for the purpose of sealing, for example, plastic, hemp, Teflon, butyl, polymer, plastic, polycarbonate, polyethylene, polypropylene, polyvinylchloride, and metal. Seal 24 and seal ring seal 36 may be any shape suitable for a particular configuration or environment, for example, round, annular, spherical, and a strip. In one embodiment, seal 24 is a butyl o-ring configured to sealably contact activator 22. Seal ring seal 36 is a butyl o-ring configured to sealably contact outer shell 30.

Controlling the flow of pressurized liquid through on-off controller 10 may be accomplished in any manner, using any suitable apparatus, using any suitable body 12, activator 22, position mechanism 16, and seal 24. The position of the activator 22 may define any number of operating states in which the flow of pressurized fluid may be controlled in any manner. In an exemplary embodiment, the position of the activator 22 may define three operating states: an on-state, an off-state, and a vent state. The position of the activator 22 and the detent 46 may define a fourth on-locked-state. In another embodiment, the position of the activator 22 defines four operating states: an on-state, an off-state, a seal-outlets-state, and a vent state. For this embodiment, the seal-outlets-state pneumatically isolates the outlets such that venting pressurized fluid from the body cavity 80 does not vent pressurized fluid from the outlets or any cavity in fluid communication with an outlet.

Placing the on-off controller 10 in an on-state may be accomplished in any manner. In an exemplary embodiment, referring to FIGS. 5, 6 and 10, on-off controller 10 is placed in the on-state when activator 22 is positioned using position mechanism 16 such that activator 22 contacts and depresses the poppet of a bottle (not shown) of pressurized fluid to such an extent that pressurized fluid flows from the bottle into the inlet 14 of body 12. In an exemplary embodiment configured in the on-state, vent cavity 82, connection bores 100, and vent channel 18 are isolated from the pressurized fluid in the body cavity 80 by the sealable contact between seal 24 and activator 22. In an exemplary embodiment, the outlets 20 may be in continuous fluid communication with the inlet 14; therefore, any pressurized fluid that may enter the inlet 14 may exit at any of the outlets 20.

Placing the on-off controller 10 in an on-locked-state may be accomplished in any manner. In an exemplary embodiment, referring to FIGS. 5, 6 and 10, on-off controller 10 is placed in the on-locked-state when activator 22 is positioned using position mechanism 16 such that activator 22 contacts and depresses the poppet of a bottle (not shown) of pressurized fluid to such an extent that pressurized fluid flows from the bottle into the inlet 14 of body 12 and detent 46 engages outer shell 30 in such a manner as to hold activator connector 44 substantially immobile; thereby holding the on-off controller 10 in the on-state.

Placing the on-off controller 10 in an off-state may be accomplished in any manner. In an exemplary embodiment, referring to FIG. 4, on-off controller 10 is placed in the off-state when position mechanism 16 is turned such that the resilient force on bottle poppet (not shown) pushes activator 22 such that activator 22 no longer depresses the poppet and pressurized fluid no longer exits the bottle. Additionally, in the off-state, vent cavity 82, connection bores 100, and vent channel 18 are isolated from the pressurized fluid in the body cavity 80 by the seal created from the sealable contact between seal 24 and activator 22. Therefore, in the off-state, body cavity 80 may retain pressurized fluid when pneumatic devices connected to the outlets 20 do not drain or decrease the fluid pressure established while the activator 22 was in the on-state. In an exemplary embodiment, the outlets 20 connect to a paintball marker through hoses. In the on-state, the fluid pressure established by the flow of pressurized fluid from the bottle may remain unchanged when the on-off controller 10 is switched to the off-state; therefore, in the off-state, the body cavity 80, the outlets 20, and the hoses connected between the outlets 20 and the paintball marker retain pressurized fluid.

Placing the on-off controller 10 in a vent-state may be accomplished in any manner. In an exemplary embodiment, referring to FIG. 3, on-off controller 10 may enter the vent-state when activator 22 is positioned using position mechanism 16 such that activator 22 no longer contacts and/or depresses the poppet on a bottle of pressurized air (not shown) and seal 24 no longer sealably contacts activator 22. In the vent-state, pressurized fluid in body cavity 80 passes between the seal 24 and the activator 22, through vent passage 84, through vent cavity 82, and out the connection bores 100 and vent channel 18 to the atmosphere. The vent-state may also drain any pressurized fluid from any pneumatic device and/or pressurized cavities in fluid communication with outlets 20.

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. An on-off controller for controlling the flow of fluid from a provided bottle, wherein the bottle has a poppet valve biased in a closed position, wherein fluid flows from the bottle when the poppet valve is open, the on-off controller comprising:

a body having an axis along a center of the body, a cavity, an inlet, and an outlet, wherein the inlet is positioned axially to the axis and couples to the bottle, the inlet and the outlet have continuous fluid communication with the cavity;

a bore formed through the body for receiving a provided bolt, wherein each end portion of the bore is open at an exterior of the body, the bore is not parallel to the axis, and the bore intersects the axis;

an activator positioned in the body that opens the poppet valve, wherein the activator does not obstruct the bore; and a position mechanism that moves the activator, wherein the bore is positioned between the inlet and the position mechanism.

2. The on-off controller of claim 1 wherein:

at least a portion of the activator is positioned axially to the axis in the body; and the position mechanism moves the axially positioned portions of the activator axially.

3. The on-off controller of claim 1 further comprising a bolt positioned in the bore, wherein the bolt connects the on-off controller directly to a provided paintball marker.

4. The on-off controller of claim 1 further comprising a paintball marker and a bolt, wherein the bolt is positioned in the bore and the bolt connects the on-off controller directly to the paintball marker.

5. The on-off controller of claim 1 further comprising a vent passage and a seal, wherein the vent passage provides sealable fluid communication between the cavity and the atmosphere.

6. The on-off controller of claim 4 wherein in response to movement of the activator, the activator contacts the seal thereby sealing the vent passage.

7. The on-off controller of claim 1 wherein the position mechanism comprises at least one of a lever, a knob, a threaded knob, a two-start threaded knob, a solenoid, a magnet, a stepping motor, and a servo motor.

8. The on-off controller of claim 1 wherein the body comprises an outer shell and a gas wall insert, wherein:

the gas wall insert has an axial bore and is positioned axially in the body; and at least a part of the activator is positioned in the axial bore.

9. The on-off controller of claim 1 wherein the position mechanism comprises a knob and a detent, wherein the knob couples to the activator and the detent retains the position mechanism in an on-state position.

10. An on-off controller for controlling the flow of fluid from a provided bottle, wherein the bottle has a poppet valve biased in a closed position, wherein fluid flows from the bottle when the poppet valve is open, the on-off controller comprising:

a body having an axis along a center of the body, a cavity, an inlet, an outlet, and a vent passage, wherein the inlet is positioned axially to the axis and couples to the bottle, the inlet and the outlet have continuous fluid communication with the cavity, and the vent passage provides sealable fluid communication between the cavity and the atmosphere;

a bore formed through the body for receiving a provided bolt, wherein each end portion of the bore is open at the exterior of the body, the bore is not parallel to the axis, and the bore intersects the axis;

an activator positioned in the body that opens the poppet valve, wherein the activator does not obstruct the bore, and the position of the activator defines operating states comprising:

an on-state, wherein the poppet valve is open and the vent passage is sealed, whereby pressurized fluid enters the inlet;

an off-state, wherein the poppet valve is closed and the vent passage is sealed, whereby pressurized fluid stops entering the inlet and remains in the cavity;

a vent-state, wherein the poppet valve is closed and the vent passage is open, whereby pressurized fluid in the cavity vents to the atmosphere;

a position mechanism that moves the activator, wherein the bore is positioned between the inlet and the position mechanism; and a seal that sealably contacts the activator in the on-state and the off-state, thereby sealing the vent passage.

11. The on-off controller of claim 10 further comprising a bolt positioned in the bore, wherein the bolt connects the on-off controller directly to a provided paintball marker.

12. The on-off controller of claim 10 wherein the position mechanism comprises at least one of a lever, a knob, a threaded knob, a two-start threaded knob, a solenoid, a magnet, a stepping motor, and a servo motor.

13. An on-off controller for controlling the flow of fluid from a provided bottle, wherein the bottle has a poppet valve biased in a closed position, wherein fluid flows from the bottle when the poppet valve is open, the on-off controller comprising:

a body having an axis along a center of the body, a cavity, an inlet, and an outlet, wherein the inlet is positioned axially to the axis and couples to the bottle, the inlet and the outlet have continuous fluid communication with the cavity;

a bore formed through the body for receiving a provided bolt, wherein each end portion of the bore is open at the exterior of the body, the bore is not parallel to the axis, and the bore intersects the axis;

an activator having an opening therethrough, the activator positioned in the body to open the poppet valve, wherein the opening aligns with the bore; and a position mechanism that moves the activator.

14. The on-off controller of claim 13 wherein:

at least a portion of the activator is positioned axially in the body; and the position mechanism moves the axially positioned portions of the activator axially.

15. The on-off controller of claim 13 further comprising a bolt positioned in the bore and in the opening, wherein the bolt connects the on-off controller directly to a provided paintball marker.

16. The on-off controller of claim 13 further comprising a paintball marker and a bolt, wherein the bolt is positioned in the bore and in the opening, the bolt connects the on-off controller directly to the paintball marker.

17. The on-off controller of claim 13 wherein the bore is positioned between the inlet and the position mechanism.

18. The on-off controller of claim 13 wherein the position mechanism comprises a knob and a detent, wherein the knob couples to the activator and the detent retains the position mechanism in an on-state position.

19. The on-off controller of claim 13 wherein the position mechanism comprises at least one of a lever, a knob, a threaded knob, a two-start threaded knob, a solenoid, a magnet, a stepping motor, and a servo motor.

20. The on-off controller of claim 13 wherein the opening comprises a slot.

* * * * *